United States Patent
Moradnia (10) Patent No.: US 12,115,850 B2
(45) Date of Patent: Oct. 15, 2024

(54) AIR GUIDE DUCT WITH SPLITTER AND UNDERBODY TRAY

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 17/837,413

(22) Filed: Jun. 10, 2022

(65) Prior Publication Data
US 2023/0398858 A1 Dec. 14, 2023

(51) Int. Cl.
 *B60K 11/08* (2006.01)
 *B60R 19/48* (2006.01)

(52) U.S. Cl.
 CPC .............. *B60K 11/08* (2013.01); *B60R 19/48* (2013.01); *B60R 2019/486* (2013.01)

(58) Field of Classification Search
 CPC .... B60K 11/08; B60R 19/48; B60R 2019/486
 See application file for complete search history.

(56) References Cited

U.S. PATENT DOCUMENTS

| 3,696,730 | A |  | 10/1972 | Masuda et al. | |
|---|---|---|---|---|---|
| 4,653,788 | A | * | 3/1987 | Di Giusto | B60R 19/48 296/180.1 |
| 4,673,206 | A | * | 6/1987 | Kretschmer | B62D 35/005 296/180.1 |
| 5,322,340 | A | * | 6/1994 | Sato | B62D 25/2036 296/180.1 |
| 5,490,572 | A | * | 2/1996 | Tajiri | B60L 1/02 180/68.5 |
| 5,526,872 | A | * | 6/1996 | Gielda | B60K 11/02 296/180.1 |
| 5,915,490 | A | * | 6/1999 | Wurfel | B60K 11/08 180/68.1 |
| 5,918,663 | A | * | 7/1999 | Hoglinger | B60R 19/48 165/41 |
| 7,270,206 | B2 | * | 9/2007 | Guertler | B60K 11/06 180/69.1 |
| 7,886,859 | B2 | * | 2/2011 | Caldirola | B60K 11/04 165/44 |

(Continued)

FOREIGN PATENT DOCUMENTS

| DE | 102007023230 A1 * | 11/2008 | ............. B60K 11/08 |
|---|---|---|---|
| DE | 102007023231 A1 * | 11/2008 | ............. B60K 11/08 |

(Continued)

*Primary Examiner* — Jacob B Meyer
(74) *Attorney, Agent, or Firm* — Plumsea Law Group, LLC (57) ABSTRACT

An air guiding system for a vehicle including an air guide duct having at least one air inlet, the air guide duct further having a first air outlet, a second air outlet, and an internal flow splitter. The flow splitter is disposed within the air guide duct such that a first portion of incoming air flows to the first and second air outlets, and a second portion of incoming air flows through the flow splitter. The first air outlet is configured to discharge air into one of the pair of opposing front wheel wells and the second air outlet is configured to discharge air into another of the pair of opposing front wheel wells. A further aspect of the disclosure provides an underbody tray including a plurality of openings configured to allow airflow through the underbody tray, the underbody tray being disposed below the air guide duct.

19 Claims, 6 Drawing Sheets

(56) References Cited

U.S. PATENT DOCUMENTS

| | | | |
|---|---|---|---|
| 8,474,557 B2 * | 7/2013 | Wolf | B60T 5/00 180/68.1 |
| 8,517,451 B2 * | 8/2013 | Kakiuchi | B62D 35/02 296/180.1 |
| 8,544,583 B2 * | 10/2013 | Ajisaka | B62D 35/02 180/68.1 |
| 8,631,889 B2 * | 1/2014 | Begleiter | B60T 5/00 180/68.1 |
| 8,668,245 B2 * | 3/2014 | Kakiuchi | B62D 35/02 296/180.1 |
| 8,752,660 B2 * | 6/2014 | Ajisaka | B60K 11/08 180/69.1 |
| 9,188,052 B2 * | 11/2015 | Tajima | F01P 5/06 |
| 9,199,674 B2 * | 12/2015 | Wolf | B60K 11/08 |
| 9,676,422 B2 * | 6/2017 | Schmidt | B62D 25/085 |
| 9,744,848 B2 * | 8/2017 | Ho | B60K 11/085 |
| 9,809,108 B2 * | 11/2017 | Ribaldone | B62D 37/02 |
| 9,926,022 B1 * | 3/2018 | Golembeski | B60K 11/08 |
| 10,167,915 B2 | 1/2019 | Titus et al. | |
| 10,202,049 B2 | 2/2019 | Nagaosa | |
| 10,344,663 B2 * | 7/2019 | Nam | B60H 1/3211 |
| 10,351,181 B2 * | 7/2019 | McKillen | B62D 35/00 |
| 10,569,643 B2 * | 2/2020 | Gilotte | B60K 11/08 |
| 10,953,741 B2 * | 3/2021 | Temple | F01P 11/10 |
| 11,027,785 B1 * | 6/2021 | Golan | B62D 35/00 |
| 11,136,076 B2 * | 10/2021 | Park | B62D 35/02 |
| 11,548,374 B2 * | 1/2023 | Yamauchi | B60K 11/08 |
| 11,548,571 B2 * | 1/2023 | Moradnia | B60K 13/04 |
| 11,642,933 B2 * | 5/2023 | Moradnia | B60H 1/00328 165/202 |
| 11,725,569 B1 * | 8/2023 | Abeysinghe | F01P 11/10 123/42 |
| 11,891,941 B2 * | 2/2024 | Abeysinghe | F01P 11/12 |
| 11,891,942 B1 * | 2/2024 | Moradnia | B60H 1/00385 |
| 11,945,423 B2 * | 4/2024 | Moradnia | F16D 65/847 |
| 11,981,195 B2 * | 5/2024 | Moradnia | B60K 11/08 |
| 2003/0183432 A1 * | 10/2003 | Suzuki | B60K 11/08 180/68.1 |
| 2012/0318476 A1 * | 12/2012 | Begleiter | B60T 5/00 165/51 |
| 2013/0059519 A1 * | 3/2013 | Tajima | B60K 11/04 454/152 |
| 2013/0248141 A1 * | 9/2013 | Maurer | B60K 11/08 165/44 |
| 2019/0383204 A1 * | 12/2019 | Wolf | B60K 11/04 |
| 2023/0398858 A1 * | 12/2023 | Moradnia | B60K 11/06 |
| 2024/0075805 A1 * | 3/2024 | Kondoh | B60K 11/08 |

FOREIGN PATENT DOCUMENTS

| | | | | |
|---|---|---|---|---|
| DE | 102014207347 A1 | | 10/2015 | |
| DE | 102015008624 A1 * | | 2/2016 | B60K 11/08 |
| DE | 102015009374 A1 | | 3/2016 | |
| DE | 102020001881 A1 | | 4/2020 | |
| DE | 102019102406 B3 | | 8/2020 | |
| FR | 2895324 A1 * | | 6/2007 | B60K 11/02 |
| KR | 200167751 Y1 | | 3/2000 | |
| KR | 20200030260 A * | | 3/2020 | |
| KR | 20210056500 A | | 5/2021 | |
| WO | WO-2006074779 A1 * | | 7/2006 | B60K 11/08 |
| WO | WO-2017190731 A1 * | | 11/2017 | |

* cited by examiner

AIR GUIDE DUCT WITH SPLITTER AND UNDERBODY TRAY

BACKGROUND

1. Field of the Disclosure

The present disclosure relates to an air guide duct for a vehicle and, more particularly, to an air guide duct configured to guide a first portion of cooling air flow into at least one wheel well and a second portion of cooling air flow through a flow splitter including a plurality of openings configured for airflow across a vehicle motor. An underbody tray or cover including a plurality of openings configured for airflow across the vehicle motor may also be provided.

2. Description of Related Art

Motor vehicles as known in the art, and especially electric motor vehicles, generally include a cooling package to provide cooling air flow towards the motor when the vehicle is in motion.

Vehicles have been designed in the past to direct the discharge airflow from a cooling package through the hood of the vehicle. This type of prescribed air flow path is beneficial in some instances because it isolates the cooling air flow and prevents it from unnecessarily contacting components within the front compartment of the vehicle. The air duct can reduce air flow resistance to thereby improve aerodynamic drag as well as increase the air mass flow over the motor. However, such air ducts do not provide for localized cooling on predetermined portions of the motor or direction of the cooling air over and around the motor.

There is a need in the art for an air guide duct system and method configured to efficiently guide and discharge cooling air flow over and around a motor without impacting the exterior styling of the vehicle or requiring an unduly amount of space under the hood.

SUMMARY

Heretofore, very few vehicles have incorporated ducting downstream of the cooling package and, in general, the use of downstream ducting for improvement in the cooling system has been overlooked.

In one aspect, the disclosure provides an air guiding system including an air guide duct having at least one air inlet configured to be disposed forward of the front wheel wells, the air guide duct further having a first air outlet, a second air outlet, and an internal flow splitter. The flow splitter is disposed within the air guide duct such that a first portion of incoming air through the at least one air inlet flows to the first air outlet and the second air outlet, and a further second portion of incoming air through the at least one air inlet flows through the flow splitter. The first air outlet is configured to discharge air into one of the pair of opposing front wheel wells and the second air outlet is configured to discharge air into another of the pair of opposing front wheel wells.

A system and method for guiding air flow through a front end of a motor vehicle according to a further aspect of the disclosure includes providing an air guide duct in the front end of the motor vehicle; directing a first portion of air flow from at least one air inlet of the air guide duct through a body of the air guide duct, and towards at least one air outlet of the air guide duct; discharging the first portion of air flow through the at least one air outlet into a wheel well of the motor vehicle; directing a second portion of air flow from the at least one air inlet of the air guide duct through an internal flow splitter within the air guide duct; and discharging the second portion of air flow from beneath the front end of the motor vehicle.

In another aspect, a motor vehicle according to the disclosure includes a front end; a motor mounted within the front end of the motor vehicle; a pair of opposing front wheel wells rearward of the front end; and an air guide duct having at least one air inlet disposed forward of the front wheel wells and facing the front end of the motor vehicle, the air guide duct further including an internal flow splitter having a plurality of openings and at least one air outlet opening into at least one of the front wheel wells. A first portion of incoming air from the at least one air inlet is guided by the air guide duct through the at least one air outlet opening and is discharged into at least one of the front wheel wells; and a second portion of incoming air from the at least one air inlet passes through the plurality of openings in the internal flow splitter and is discharged under the motor vehicle.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The disclosure herein is directed to a cooling system for a vehicle having an air guide duct for guiding incoming air flow over and around a motor, where a first portion of the air flow discharges via the underbody of the vehicle and a second portion of the air flow discharges into at least one of the wheel wells of the vehicle. According to a further aspect of the disclosure, an underbody cooling system may also be provided, in combination with the air guide duct, for further cooling of the motor. While the use of an air duct to discharge air flow into the top or through the hood of an engine compartment is known, as is the conventional use of wheel wells to discharge the engine compartment air flow, it has not previously been contemplated to divide or split the incoming air flow into multiple flows within the duct to improve localized cooling on the motor as well as both the aerodynamics and thermodynamics of a vehicle.

Referring to FIGS. 1-4B, an exemplary embodiment of an air guide duct for a vehicle is shown generally by reference numeral 10. The air guide duct 10 is disposed under the hood 18 of a vehicle 12 and generally forward of the motor 20, such that the air guide duct 10 receives the incoming air flow from at least one cooling fan assembly (not shown) as the vehicle is in motion and discharges at least a first portion of the air flow into the wheel wells 16a, 16b. The air guide duct 10 further includes an internal guide vane 22 having a plurality of openings 24 in order to guide a further second portion of the incoming air flow over the top and around the sides of the motor 20. Motor 20 is illustrated as an electric motor in the exemplary embodiment but other types and motor and engines could of course also be used.

According to the exemplary embodiment of the disclosure, air guide duct 10 includes at least one air inlet opening 32 receiving the discharge from at least one cooling fan assembly (not shown), an air guide duct body portion 34 and opposing air outlet openings 36a, 36b which discharge at least a portion of the air flow into a respective wheel well 16a, 16b. The air inlet openings 32 are disposed forward of the front wheel wells 16a, 16b and the openings 32 are facing the front end 38 of the vehicle 12. The illustrated exemplary embodiment of the disclosure includes two air inlet openings 32 in order to accommodate the use of two fan assemblies in the cooling system so as to increase the air mass flow rate, however, one skilled in the art will appreciate that a single fan assembly and a single air inlet opening 32 could also be provided. Hence, with reference to FIG. 4A, air enters through the front end 38 of the vehicle 12 and air flow A1 passing through air inlet openings 32 defines the incoming air flow path into the front compartment 14 of the vehicle. Air guide duct 10 further includes an internal flow splitter or guide vane 22 which divides or splits the incoming fan discharged air flow A1 such that a first portion of the air flow is guided around the sides of the motor and towards the wheel wells and a second portion of the cooling air is guided over and onto the motor through breathing holes or perforations formed in the splitter 22. The splitter 22 is disposed within the body portion 34 of the air duct forward of the motor 20, with the rearmost edge of the splitter 22 generally aligned with a terminal lower edge 42 of the air duct 10. In the exemplary embodiment, the splitter 22 has a generally V-shaped configuration including a first vane 23a and a second vane 23b for complementary use with the two air flow inlet openings 32. However, if only a single air inlet opening 32 were provided in the air duct 10, the shape of the splitter can be correspondingly changed as needed to better complement only a single flow of incoming air through a single air flow inlet opening 32 such as, for example, only a single vane.

Figure 6:
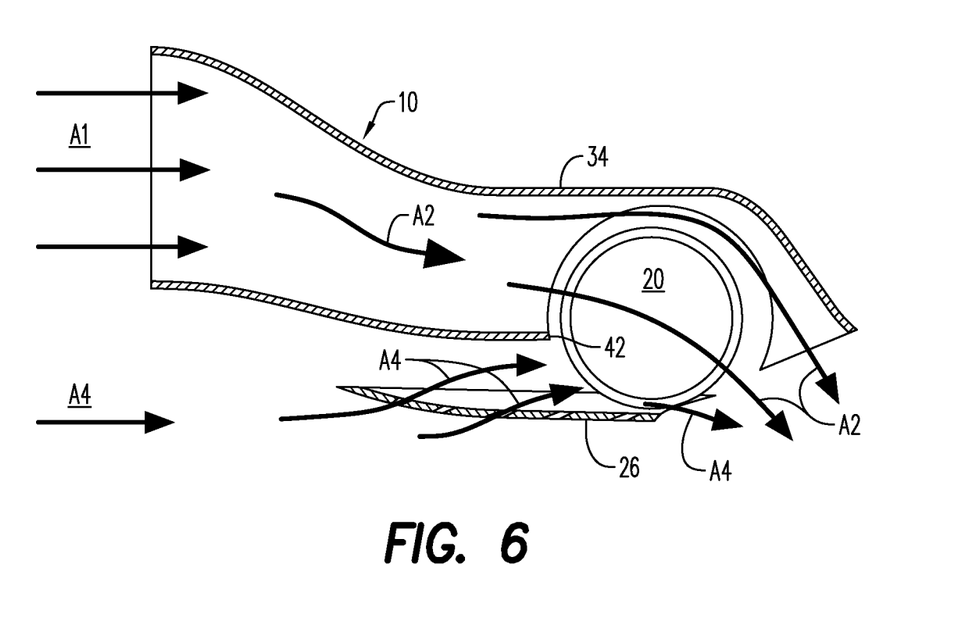
FIG. 6 is a side view of the air guide duct taken generally along the line 6-6 shown in FIG. 3A.

More particularly, a portion of air flow A1 passes through a plurality of openings or perforations 24 in the flow splitter 22 such that air flow A2 is directed over the top and around the motor 20 before being discharged via the underbody of the vehicle, as shown in FIG. 6. The through-openings or perforations 24 in the flow splitter 22 may have any suitable shape such as, merely by way of example, circular, square, triangular, pentagram, hexagon, or rectangular. The size, number and orientation of the openings 24 can also be chosen appropriately depending on the environment and particular cooling required. The openings 24 may also have a "cheese-grater" configuration that form passages defined by a generally scoop shape 25a on the upstream side of the flow splitter 22 (i.e., forward surface which receives airflow A1), and a hood shape 25b on the downstream side of flow splitter 22 (i.e., rearward surface which directs air flow A2), as shown best in FIG. 4B. The scoop shape 25a functions to provide a funnel effect and increase the air flow rate through the openings 24. The hood shaped 25b on the interior or downstream side assists with directionality of the air flow A2 after it passes through the perforations 24. In the exemplary embodiment shown, openings 24 are configured with an inward orientation relative to the longitudinal axis of the vehicle underbody, that is, towards the centerline in the illustrated figure so as to direct the airflow towards the centerline of the vehicle which generally corresponds to the location of the motor. The plurality of perforations 24 and the variability of their configuration and location allows the flow splitter 22 to direct increased air flow A2 to a predetermined location on the motor as needed, such as a motor hot spot.

However, the flow splitter 22 extends across only a portion of the interior lateral cross-section of the air guide body portion 34. Thus, while a first portion of the air flow A1 passes through the flow splitter 22 and cools the motor via air flow A2, a remainder or second portion of the air flow A1 passes around the flow splitter 22. The second portion of the air flow A1 which passes around the flow splitter 22 is guided within the air duct 10 to the air outlets 36a, 36b which discharge an air flow A3 through an inboard side surface 17a, 17b of the respective wheel wells 16a, 16b, inboard of the tires 40. In the exemplary embodiment of the disclosure, there is a substantially perpendicular component of the discharge air flow A3 impacting the side face of the tire and wheel. One skilled in the art will appreciate that such interaction of the discharge air with the tire and wheel will impair the aerodynamics of the vehicle. Accordingly, the air guide duct according to the disclosure herein is configured to achieve a balance between the angle of discharged air flow impinging upon the wheel and tire and the desired aerodynamic and thermodynamic performance of the vehicle.

Figure 1:
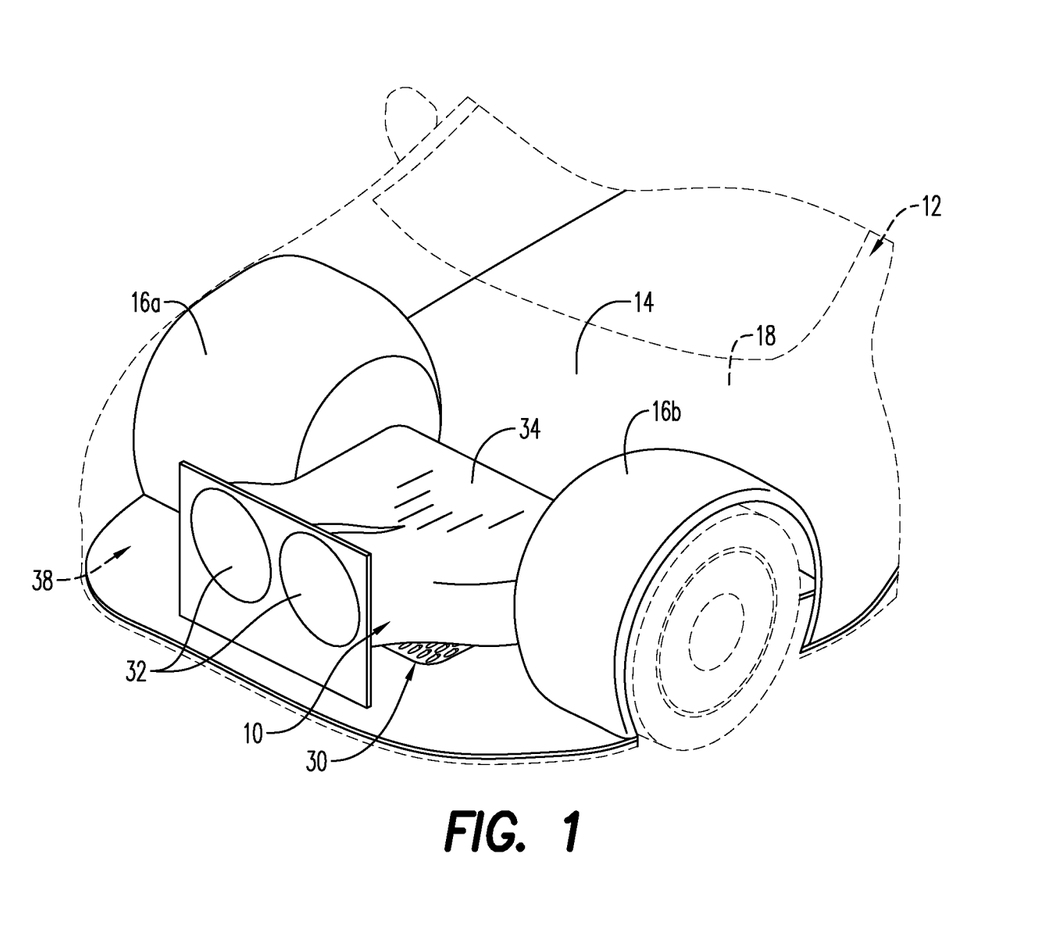
FIG. 1 illustrates a schematic perspective view of an air guide duct and underbody cooling tray for a vehicle according to an exemplary embodiment of the disclosure herein.
Figure 2:
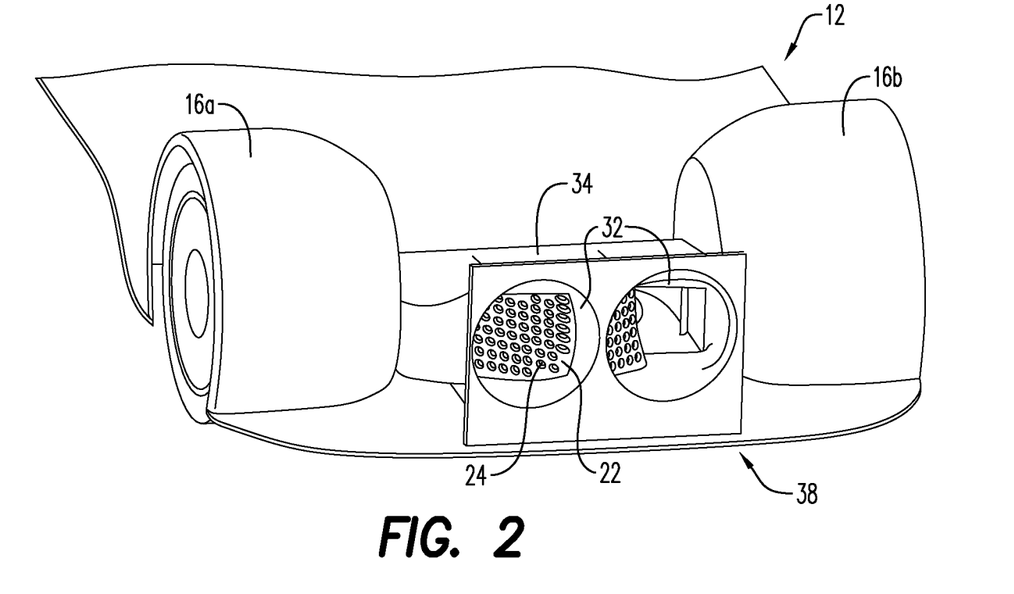
FIG. 2 is a further schematic perspective view of the air guide duct in a vehicle according to the exemplary embodiment of the disclosure herein.
Figure 3A:
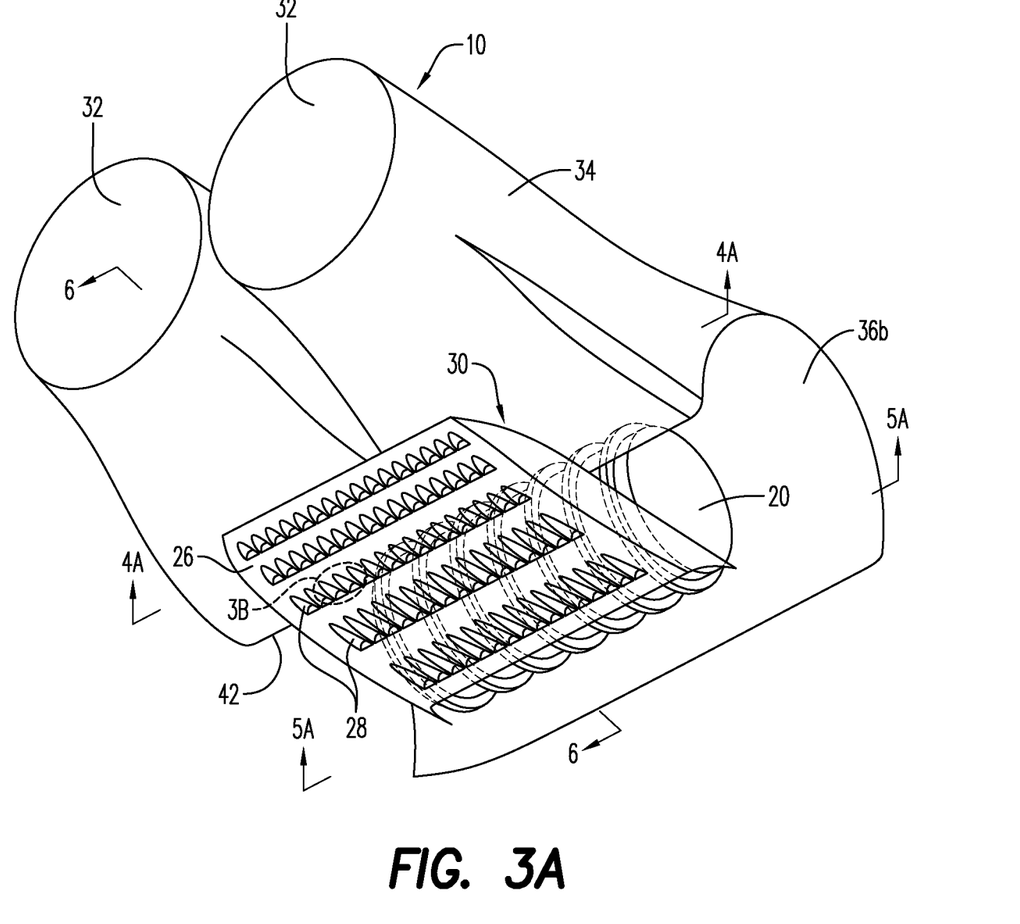
FIG. 3A is an enlarged bottom perspective view of the air guide duct and underbody cooling tray shown in FIG. 1.
Figure 3B:
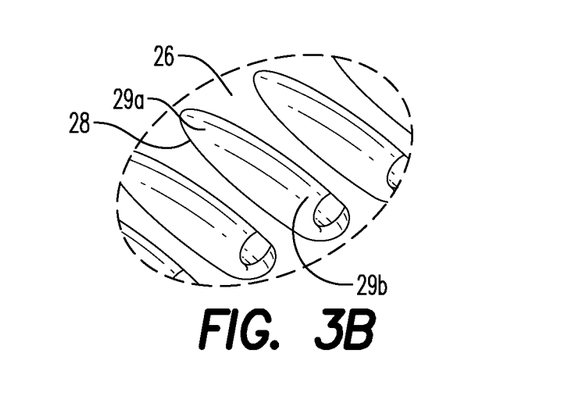
FIG. 3B is an enlarged detail of openings in the underbody cooling tray shown in FIG. 3A.
Figure 4A:
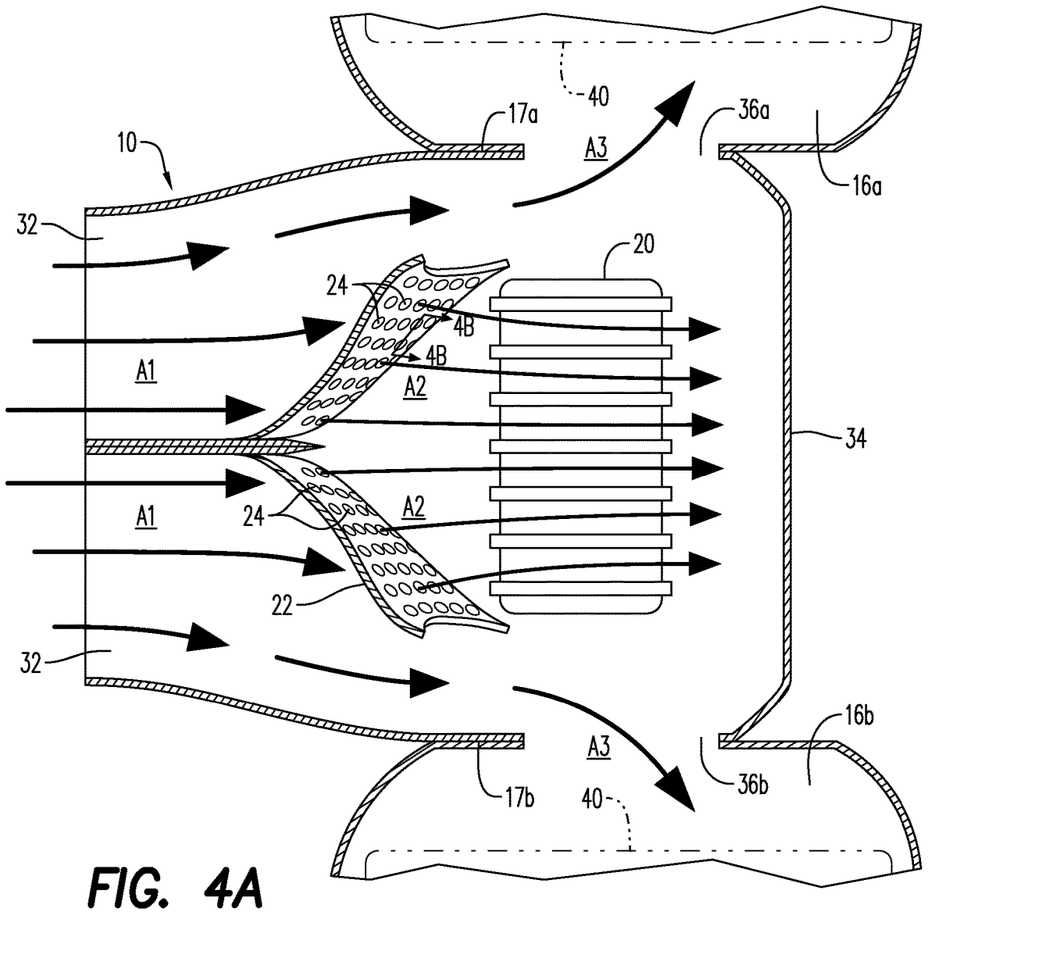
FIG. 4A is a bottom view of the air guide duct taken generally along the line 4-4 shown in FIG. 3A.
Figure 4B:
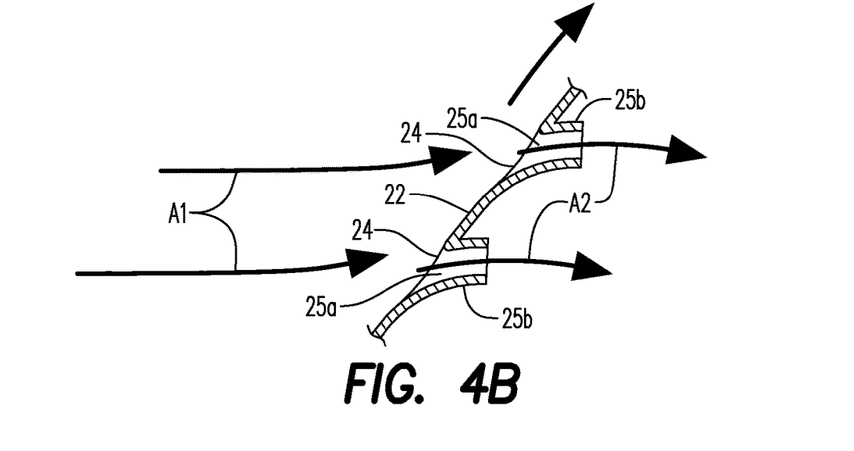
FIG. 4B is a cross section taken generally along line 4B-4B shown in FIG. 4A.
Figure 5A:
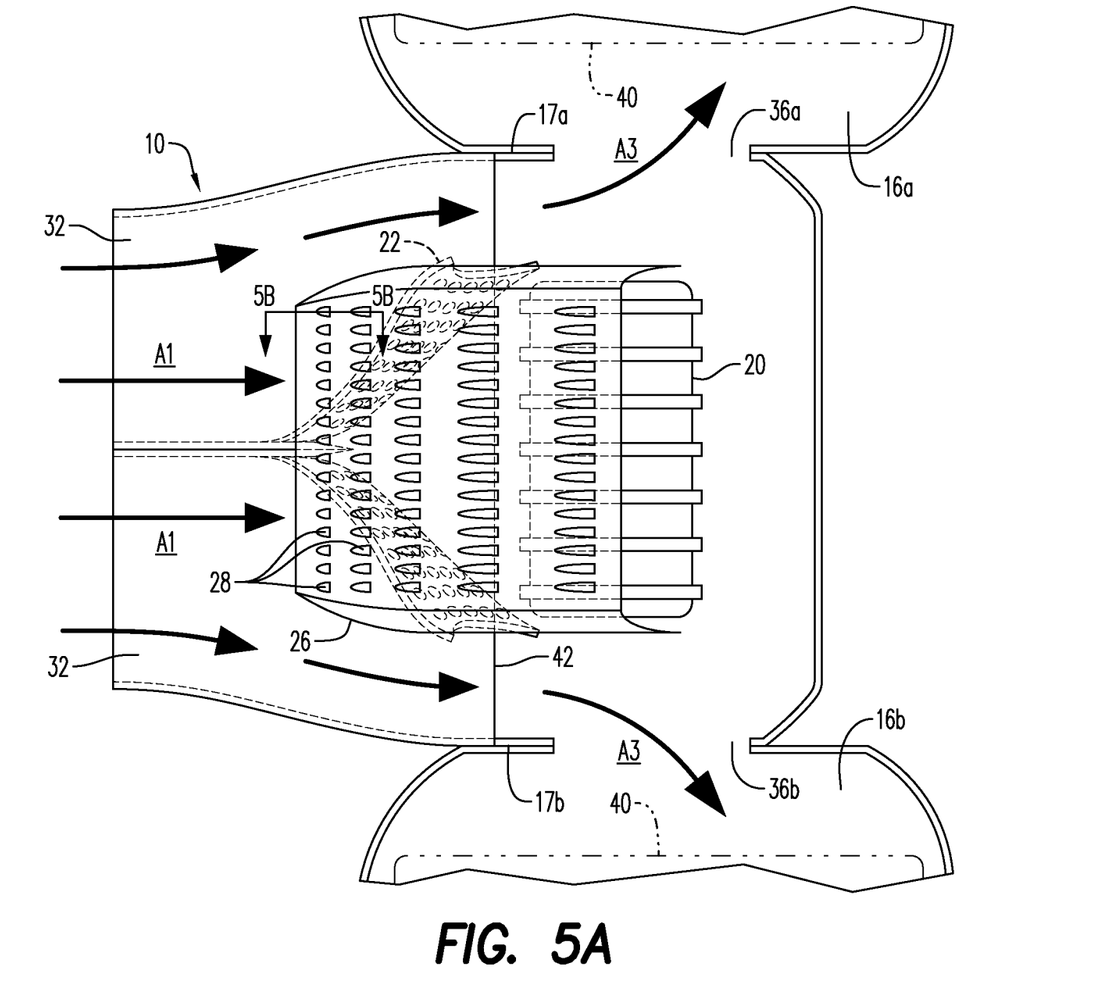
FIG. 5A is a bottom view of the air guide duct shown in FIG. 1.
Figure 5B:
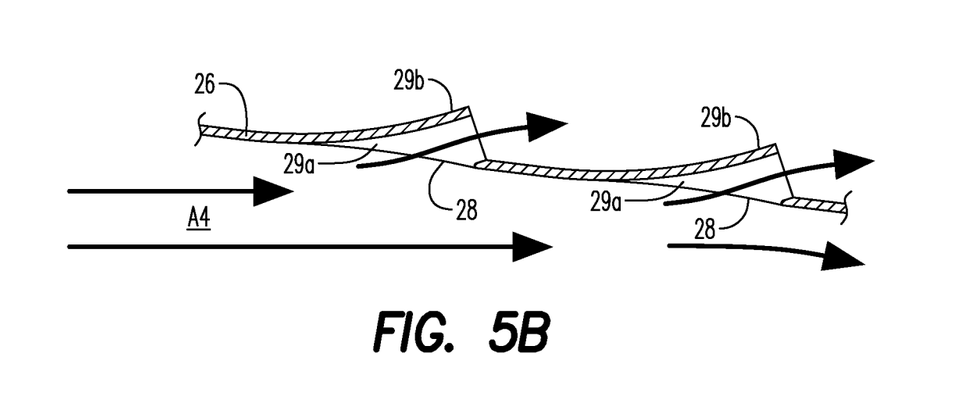
FIG. 5B is a cross section taken generally along line 5B-5B shown in FIG. 5A.

Another aspect of the disclosure herein further improves this operation by also providing an underbody cooling system to increase the air mass flow rate beneath the motor. Referring also to FIGS. 5A and 5B, the underbody cooling system according to the exemplary embodiment is shown generally by reference numeral 30. The underbody cooling system 30 includes an underbody cover or cooling tray 26 having a plurality of openings or perforations 28. The openings 28 may also have a "cheese-grater" configuration (see FIG. 3B) similar to the openings 24 described above for the internal flow splitter 22. The openings 28 form passages defined by a generally scoop shape 29a on the lower underside of the underbody tray 26 and a hood shape 29b on the upper side of underbody tray 26 which is adjacent the air duct 10. The scoop shape 29a functions to provide a funnel effect and increase the air flow rate through the openings 28. The hood shaped 29b on the upper side assists with directionality of the air flow A4 after it passes through the perforations 28. Further details of an exemplary underbody cover 26 can be found in co-pending application Ser. No.

17/141,627, filed Jan. 5, 2021, entitled "Vehicle Undercover", the entire contents of which are hereby incorporated by reference.

The underbody tray 26 is disposed generally below the air guide duct 10 and lower than a bottom surface of the motor 20. Referring also to FIG. 6, incoming airflow A4 passes through the plurality of opening 28 in the underbody tray 26 and passes along the bottom surface of the motor 20. A forward surface of the motor 20 may also be partially exposed to underbody air flow A4 passing through the underbody tray 26. The airflow A4 is then discharged through the underbody of the vehicle 12.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A motor vehicle comprising:
   a front end;
   a motor mounted within the front end of the motor vehicle;
   a pair of opposing front wheel wells rearward of the front end; and
   an air guide duct having at least one air inlet disposed forward of the front wheel wells and facing the front end of the motor vehicle, the air guide duct further including an internal flow splitter having a plurality of openings and at least one air outlet opening into at least one of the front wheel wells;
   wherein a first portion of incoming air from the at least one air inlet is guided by the air guide duct through the at least one air outlet opening and is discharged into at least one of the front wheel wells; and
   wherein a second portion of incoming air from the at least one air inlet passes through the plurality of openings in the internal flow splitter and is discharged under the motor vehicle.

2. The motor vehicle according to claim 1, wherein the openings in the internal flow splitter are configured to guide the second portion of incoming air towards the motor.

3. The motor vehicle according to claim 2, wherein the openings in the internal flow splitter define scoop shaped passages extending from a forward side of the internal flow splitter to a rearward side of the internal flow splitter.

4. The motor vehicle according to claim 1, wherein the air guide duct defines a first duct dimension and the flow splitter has a second dimension less than the first duct dimension such that the first portion of incoming air flows through the air guide duct without passing through the flow splitter.

5. The motor vehicle according to claim 1, further comprising an underbody cooling tray including a plurality of openings configured to allow airflow through the underbody cooling tray, the underbody cooling tray being disposed beneath the air guide duct.

6. The motor vehicle according to claim 5, wherein the plurality of openings in the underbody cooling tray are configured to direct incoming air flow towards the motor.

7. The motor vehicle according to claim 6, wherein the plurality of openings in the underbody cooling tray define scoop shaped passages extending from a lower side of the underbody cooling tray to an upper side of the underbody cooling tray.

8. The motor vehicle according to claim 1, wherein the at least one air inlet comprises two air inlets and the internal flow splitter defines a generally V-shaped configuration including a first guide vane and a second guide vane.

9. The motor vehicle according to claim 1, wherein the motor comprises an electric motor.

10. An air guiding system for a vehicle having a pair of opposing front wheel wells, the air guiding system comprising:
    an air guide duct having at least one air inlet configured to be disposed forward of the front wheel wells, the air guide duct further having a first air outlet, a second air outlet, and an internal flow splitter;
    wherein the flow splitter is disposed within the air guide duct such that a first portion of incoming air through the at least one air inlet flows to the first air outlet and the second air outlet, and a further second portion of incoming air through the at least one air inlet flows through the flow splitter;
    wherein the first air outlet is configured to discharge air into one of the pair of opposing front wheel wells and the second air outlet is configured to discharge air into another of the pair of opposing front wheel wells; and
    wherein the internal flow splitter includes a plurality of openings configured to guide the second portion of incoming air towards the motor.

11. The air guiding system according to claim 10, wherein the plurality of openings in the internal flow splitter define scoop shaped passages extending from a forward side of the internal flow splitter to a rearward side of the internal flow splitter.

12. The air guiding system according to claim 10, wherein the flow splitter has a width less than a predetermined width of the air guide duct such that the first portion of incoming air flows through the air guide duct and to the first air outlet and the second air outlet without passing through the flow splitter.

13. The air guiding system according to claim 10, wherein the internal flow splitter defines a generally V-shaped configuration including a first guide vane and a second guide vane.

14. The air guiding system according to claim 10, further comprising an underbody tray including a plurality of openings configured to allow airflow through the underbody tray, the underbody tray being disposed below the air guide duct.

15. A method for guiding air flow through a front end of a motor vehicle, comprising:
    providing an air guide duct in the front end of the motor vehicle;
    directing a first portion of air flow from at least one air inlet of the air guide duct through a body of the air guide duct, and towards at least one air outlet of the air guide duct;
    discharging the first portion of air flow through the at least one air outlet into a wheel well of the motor vehicle;
    directing a second portion of air flow from the at least one air inlet of the air guide duct through an internal flow splitter within the air guide duct; and
    discharging the second portion of air flow from beneath the front end of the motor vehicle.

16. The method for guiding air flow according to claim 15, wherein directing a first portion of air flow from the at least one air inlet and through the body of the air guide duct includes directing the first portion of incoming air flow through the air guide duct and to the at least one air outlet without passing through the flow splitter.

17. The method for guiding air flow according to claim 16, further comprising providing a plurality of openings in the internal flow splitter defining scoop shaped passages extending from a forward side of the internal flow splitter to a rearward side of the internal flow splitter, wherein directing a second portion of air flow through the internal flow splitter within the air guide duct includes directing the second portion of air flow through the plurality of openings in the internal flow splitter and guiding the second portion of air flow towards a motor within the front end of the motor vehicle.

18. The method for guiding air flow according to claim 17, further comprising providing a vehicle undercover having a plurality of openings extending therethrough; positioning the vehicle undercover beneath air guide duct; and directing incoming air flow through the plurality of openings in the vehicle undercover.

19. The method for guiding air flow according to claim 18, further comprising forming the plurality of openings in the vehicle undercover to direct air upwards towards the motor when the vehicle is in forward motion.

* * * * *